(12) United States Patent
Takada

(10) Patent No.: US 10,295,328 B2
(45) Date of Patent: May 21, 2019

(54) METHOD OF CALIBRATING INTERFEROMETER AND INTERFEROMETER USING THE SAME

(71) Applicant: Kabushiki Kaisha TOPCON, Tokyo (JP)

(72) Inventor: Akira Takada, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 79 days.

(21) Appl. No.: 15/121,470

(22) PCT Filed: Feb. 24, 2015

(86) PCT No.: PCT/JP2015/055251
§ 371 (c)(1),
(2) Date: Aug. 25, 2016

(87) PCT Pub. No.: WO2015/129696
PCT Pub. Date: Sep. 3, 2015

(65) Prior Publication Data
US 2016/0363434 A1 Dec. 15, 2016

(30) Foreign Application Priority Data
Feb. 26, 2014 (JP) .................... 2014-034812

(51) Int. Cl.
*G01B 9/02* (2006.01)
(52) U.S. Cl.
CPC ..... *G01B 9/02072* (2013.04); *G01B 9/02004* (2013.01); *G01B 9/02069* (2013.01); *G01B 9/02091* (2013.01)
(58) Field of Classification Search
CPC ............ G01B 9/02091; G01B 9/02072; G01B 9/02004; G01B 9/02069
See application file for complete search history.

(56) References Cited

U.S. PATENT DOCUMENTS

2004/0223135 A1* 11/2004 Ortyn ................. G01N 15/1012
356/28
2013/0286454 A1 10/2013 Toyoda et al.

FOREIGN PATENT DOCUMENTS

EP        2 662 683 A1    11/2013
JP      2007-101365 A      4/2007
(Continued)

OTHER PUBLICATIONS

S. Marschall et al., "Frequency-swept Light Sources for Optical Coherence Tomography in the 1060nm range", 2012, DTU Technical Information Center of Denmark, pp. 1-110.*
(Continued)

*Primary Examiner* — Mischita L Henson
(74) *Attorney, Agent, or Firm* — Studebaker & Brackett PC

(57) ABSTRACT

A calibration method for improving distortion of a waveform of a point-spread-function without constantly executing feedback control to a wavelength-swept light source is provided. An interference signal is generated by varying voltage to be applied to a light source within one period, the interference signal is sampled at equal time intervals on a time axis, the point-spread-function is obtained through Fourier transform by multiplying by a first window function, and a complex analysis signal including frequency information of light is obtained through inverse Fourier transform by multiplying the point-spread-function by a second window function. After a variation in a frequency of the light relative to a time within one period is obtained at equal time intervals by unwrapping phase information of the complex analysis signal, a correspondence relationship between the variation in the frequency of the light within one period and a variation in voltage within one period is obtained.

5 Claims, 8 Drawing Sheets

(56) References Cited

FOREIGN PATENT DOCUMENTS

| JP | 2012-150081 | A | | 8/2012 | | |
|----|-------------|---|---|--------|---|---|
| JP | 2015161505 | A | * | 9/2015 | ......... | G01B 9/02091 |
| JP | 2015230174 | A | * | 12/2015 | ............ | G01N 21/85 |
| JP | 5913135 | B2 | * | 4/2016 | ............ | H01S 5/141 |
| WO | 2012/093654 | A1 | | 7/2012 | | |

OTHER PUBLICATIONS

International Search Report issued in PCT/JP2015/055251, dated May 19, 2015.
Sato et al.; Actively mode-locked fiber ring laser with linear k-space sweeps; Proceedings of the IEICE conference; Sep. 3, 2013; pp. 214.

* cited by examiner

AFTER OPTIMIZATION OF SWEEP WAVEFORM

OPTIMIZATION + RESAMPLING

METHOD OF CALIBRATING INTERFEROMETER AND INTERFEROMETER USING THE SAME

TECHNICAL FIELD

This invention is related to a method of calibrating an interferometer and an interferometer using the same.

BACKGROUND ART

Optical coherence tomography (SS-OCT) for obtaining a tomographic image of a biographic body with a wavelength-swept light source as a light source of an interferometer has been conventionally known (refer to, for example, Patent Literatures 1 and 2). In such tomography, the light from the wavelength-swept light source is divided into reference light that is guided to a reference optical path and measurement light that is guided to a measurement optical path, the reference light reflected on a reference mirror disposed in the reference optical path and the measurement light scattered and reflected on the biographic body as a measurement target disposed in the measurement optical path are again synthesized to be superimposed, so that a time-varying spectrum interference signal (beat signal) is generated. This spectrum interference signal (beat signal) is detected by a detector, the beat signal is sampled at equal time intervals on a time axis, and this spectrum interference signal (beat signal) is Fourier-transformed, so that the peak of each frequency on a frequency axis is detected.

However, an inverse proportional relationship is established between the wavelength and the position corresponding to the depth of the biographic body. The wave number does not therefore linearly vary on the time axis. When a point-spread-function of the interference signal is obtained on the frequency axis by the Fourier transform, the waveform of the point-spread-function is distorted in accordance with an increase in a depth of the biographic body. As a result, the tomographic image information is deteriorated.

To solve such deterioration, Patent Literature 1 discloses a wavelength-swept light source that linearly varies the wave number on the time axis. The wavelength-swept light source includes an oscillator having an electric optical deflector, an interferometer that outputs, relative to interference light by the difference between two optical paths by traveling oscillation output light from the oscillator in two optical paths each having a different optical path length, an electric signal representing interference intensity containing an AC component of a frequency proportional to the variation in the wave number of the oscillation output light of the optical path length, an error signal generation circuit that generates a feedback signal for maintaining a constant frequency of the AC component of the electric signal, and a feedback controller having a control voltage generation circuit that generates corrected control voltage to be supplied to the electric optical deflector by applying the feedback signal to the gain relative to the lamp voltage signal.

Patent Literature 2 discloses that a spectrum interference signal is Hilbert transformed, phase information is obtained by obtaining an arc tangent of the ratio between the spectrum interference signal and the Hilbert transformed spectrum interference signal, a function representing time dependency of a sweep wavelength is obtained after the phase information is unwrapped, and calibration relative to the time dependency of a sweep light source is executed by using the time dependency of the sweep wavelength.

CITATION LIST

Patent Literature

Patent Literature 1: JP2012-150081A
Patent Literature 2: JP2007-101365A

SUMMARY

Technical Problem

However, in the technique disclosed in Patent Literature 1, the wave number is linearly varied on the time axis. More specifically, the feedback control for maintaining a constant frequency of the AC component is executed by detecting the frequency of the AC component of the electric signal obtained from the light detector of the interferometer such that a variation in the oscillation wavelength becomes constant relative to the time for maintaining the constant variation in the wave number relative to the time, so as to maintain the constant frequency of the alternating current. For this reason, it is necessary to constantly execute the feedback control during the measurement in this technique.

On the other hand, in the technique disclosed in Patent Literature 2, a function representing time dependency of a sweep wavelength is obtained, and calibration is performed to a wavelength-swept light source by using the time dependency of the sweep wavelength. Accordingly, when data is obtained by sampling a spectrum interference signal at unequal time intervals on the time axis, it is not necessary to constantly execute the feedback control during the measurement.

However, it is difficult to execute the sampling at unequal time intervals on the time axis.

The present invention has been made in view of the above circumferences. An object of the present invention is to provide a method of calibrating an interferometer capable of linearly varying a wave number on a time axis without constantly executing feedback control to a wavelength-swept light source during measurement, and an interferometer using the method.

Solution to Problem

A method of calibrating an interferometer according to the present invention includes a first step of generating a spectrum interference signal through sweep of a wavelength of light of a wavelength-swept light source by varying, relative to a time, voltage to be applied to the wavelength-swept light source within one period, a second step of obtaining a point-spread-function by sampling the spectrum interference signal at equal time intervals on a time axis, and Fourier transforming the sampled spectrum interference signal by multiplying by a first window function, a third step of obtaining a complex analysis signal including frequency information of the light of the wavelength-swept light source through Hilbert transform with inverse Fourier transform by multiplying the point-spread-function by a second window function, a fourth step of obtaining a variation in a frequency of the light relative to a time within one period at equal time intervals by unwrapping phase information of the complex analysis signal, a fifth step of obtaining a correspondence relationship between the variation in the frequency of the light within one period, which is sampled at the equal time intervals, and a variation in the voltage within one period, which is sampled at the equal time intervals, a sixth step of obtaining correspondence voltage that is obtained when the variation in the frequency of the light within one period is subdivided by using the correspondence relationship between the variation in the voltage and the variation in the frequency of the light obtained in the fifth step, and a seventh step of substituting the voltage to be applied to the wavelength-swept light source in the first step into the correspondence voltage obtained by the sixth step.

Advantageous Effects

According to the present invention, the frequency of the light can be varied at equal time intervals within one period by applying the correspondence voltage after the calibration, a wave number can be linearly varied on a time axis without constantly executing the feedback control to the wavelength-swept light source during the measurement.

DESCRIPTION OF EMBODIMENT

Embodiment

Figure 1:
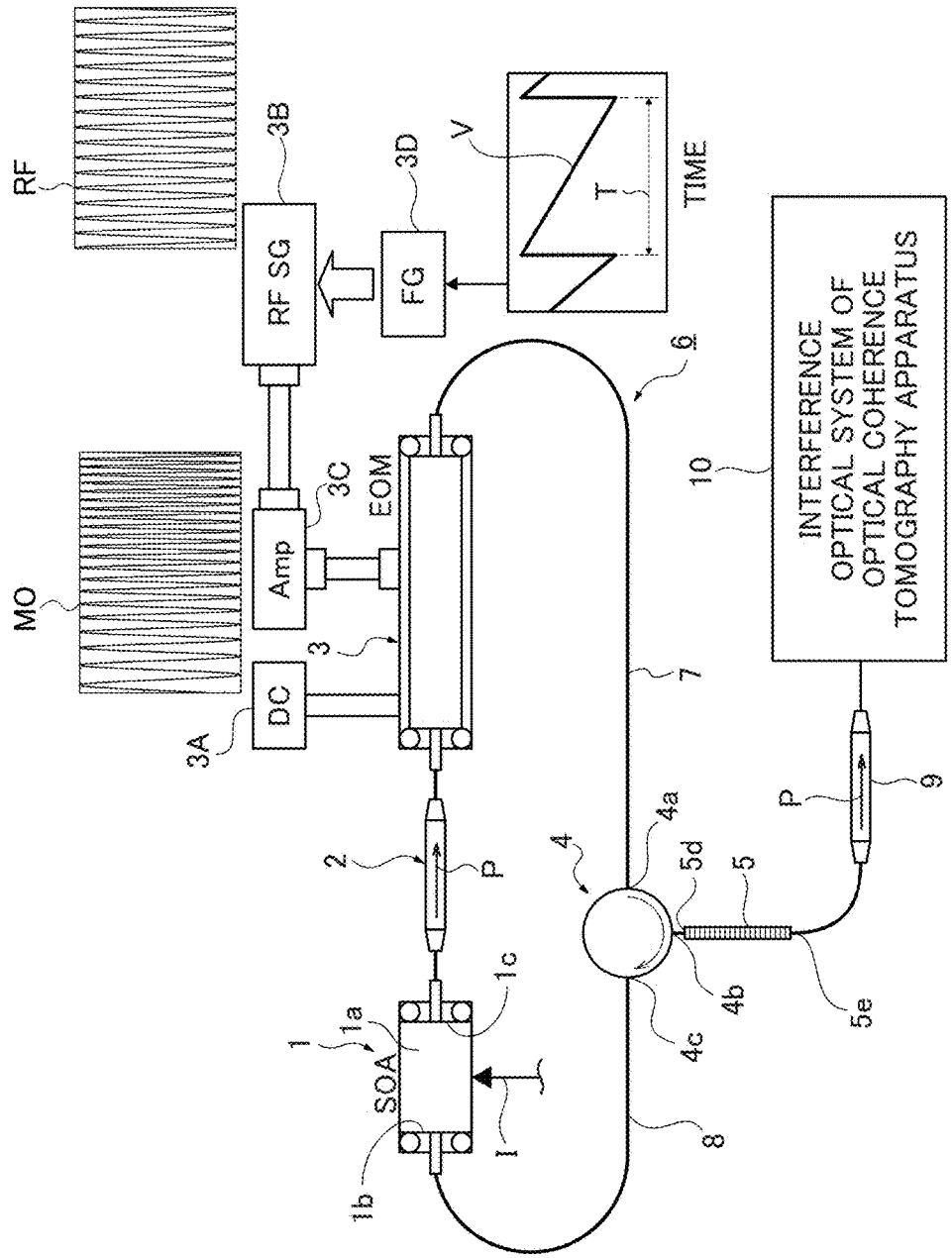
FIG. 1 is a schematic diagram illustrating a configuration of a wavelength-swept light source for use in a method of calibrating an interferometer according to an embodiment of the present invention.

FIG. 1 is a view illustrating a wavelength-swept light source (light source) for use in one embodiment of an interferometer using a method of calibrating an interferometer.

Referring to FIG. 1, reference number 1 denotes a semiconductor optical amplifier (SOA), 2 denotes an optical isolator, 3 denotes a sweep modulator (EOM), 4 denotes a circulator, and 5 denotes a dispersion compensator.

DC voltage is applied to the sweep modulator 3 from a DC circuit 3A, and an oscillation signal RF from an oscillator (RF SG) 3B is input to the sweep modulator 3 through an amplifier (Amp) 3C. Saw-tooth voltage V that periodically varies by a sweep frequency is applied to the oscillator 3B from a frequency generator (FG) 3D.

The oscillation signal RF is modulated by the voltage V. A modulation signal MO modulated by the voltage V is input to the sweep modulator 3. The sweep modulator 3 is driven by the modulation signal MO, and operates, along with a variation in the frequency of the modulation signal MO, as a voltage controller that generates the after-described spectrum interference signal by sweeping the wavelength of the light of the wavelength-swept light source.

More specifically, at least the frequency generator 3D operates as the voltage controller that generates the after-described spectrum interference signal by sweeping the wavelength of the light of the wavelength-swept light source through a variation in the voltage applied to the wavelength-swept light source relative to the time within one period.

The semiconductor optical amplifier 1, the optical isolator 2, the sweep modulator 3, the circulator 4, and the dispersion compensator 5 constitute a ring resonator 6.

The semiconductor optical amplifier 1 includes a waveguide structure 1a. The waveguide structure 1a has on the one end face thereof an incident end face 1b and the other end face thereof an emission end face 1c.

Injection current I is injected into the waveguide structure 1a, and carrier is generated in the waveguide structure 1a. The carrier is consumed by a stimulated emission phenomenon of the light pulse incident on the incident end face 1b of the waveguide structure 1a. As a result, the pulse of the laser light P is amplified, and the pulse of the laser light P is emitted from the emission end face 1c.

The pulse of the laser light P emitted from the emission end face 1c allows the light to pass through only in one direction, and is guided to the sweep modulator 3 through the optical isolator 2 as an optical element that blocks return light.

An electro-optical modulator (EOM) is used for the sweep modulator 3. In this case, the circulator 4 includes three ports. An emission light guide fiber 7 that guides the pulse of the laser light P output from the sweep modulator 3 is connected to a first port 4a of the circulator 4.

Figure 2:
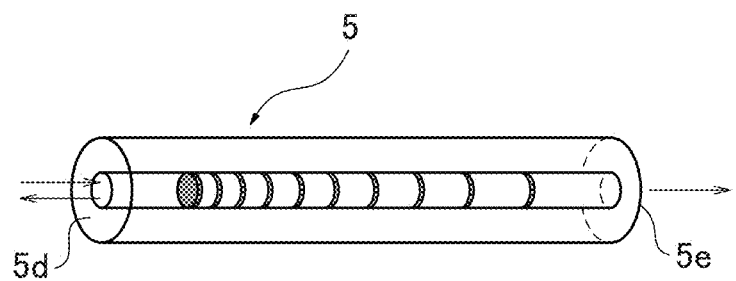
FIG. 2 is a schematic diagram illustrating a configuration of a linear chirped fiber Bragg grating illustrated in FIG. 1.

The dispersion compensator 5 is connected to a second port 4b of the circulator 4. A liner chirped fiber Bragg grating (LCFBG) schematically illustrated in FIG. 2 is used for the dispersion compensator 5.

In the liner chirped fiber Bragg grating, the period of grating varies such that a reflection position of a low frequency component of the pulse linearly differs from that of a high frequency component. The liner chirped fiber Bragg grating includes a diffracting grating in the fiber.

The liner chirped fiber Bragg grating has characteristics of both normal dispersion and abnormal dispersion according to its direction, and can be used in a normal dispersion area and an abnormal dispersion area according to a connection type of the second port 4b of the circulator 4 of the liner chirped fiber Bragg grating. In addition, in FIG. 1, reference number 5d denotes an incident end face and 5e denotes a transmission end face.

In the normal dispersion area, a long-wavelength pulse component is first reflected, and a short-wavelength pulse component is reflected afterward. In the abnormal dispersion area, a short-wavelength pulse component is first reflected, and a long-wavelength pulse component is reflected afterward. In this embodiment, the liner chirped fiber Bragg grating is used in both of the areas.

A third port 4c of the circulator 4 is connected to a feedback light guiding fiber 8 that feeds the pulse of the laser light reflected on the liner chirped fiber Bragg grating back to the semiconductor optical amplifier 1.

The pulse of the laser light P output from the transmission end face 5e of the liner chirped fiber Bragg grating is guided to an interference optical system (interferometer) 10 of an optical coherence tomography apparatus through an optical isolator 9.

According to the wavelength-swept light source, an intensity modulation frequency is varied by varying the voltage V within one period, and the oscillation wavelength of the laser light P is varied.

Figure 3:
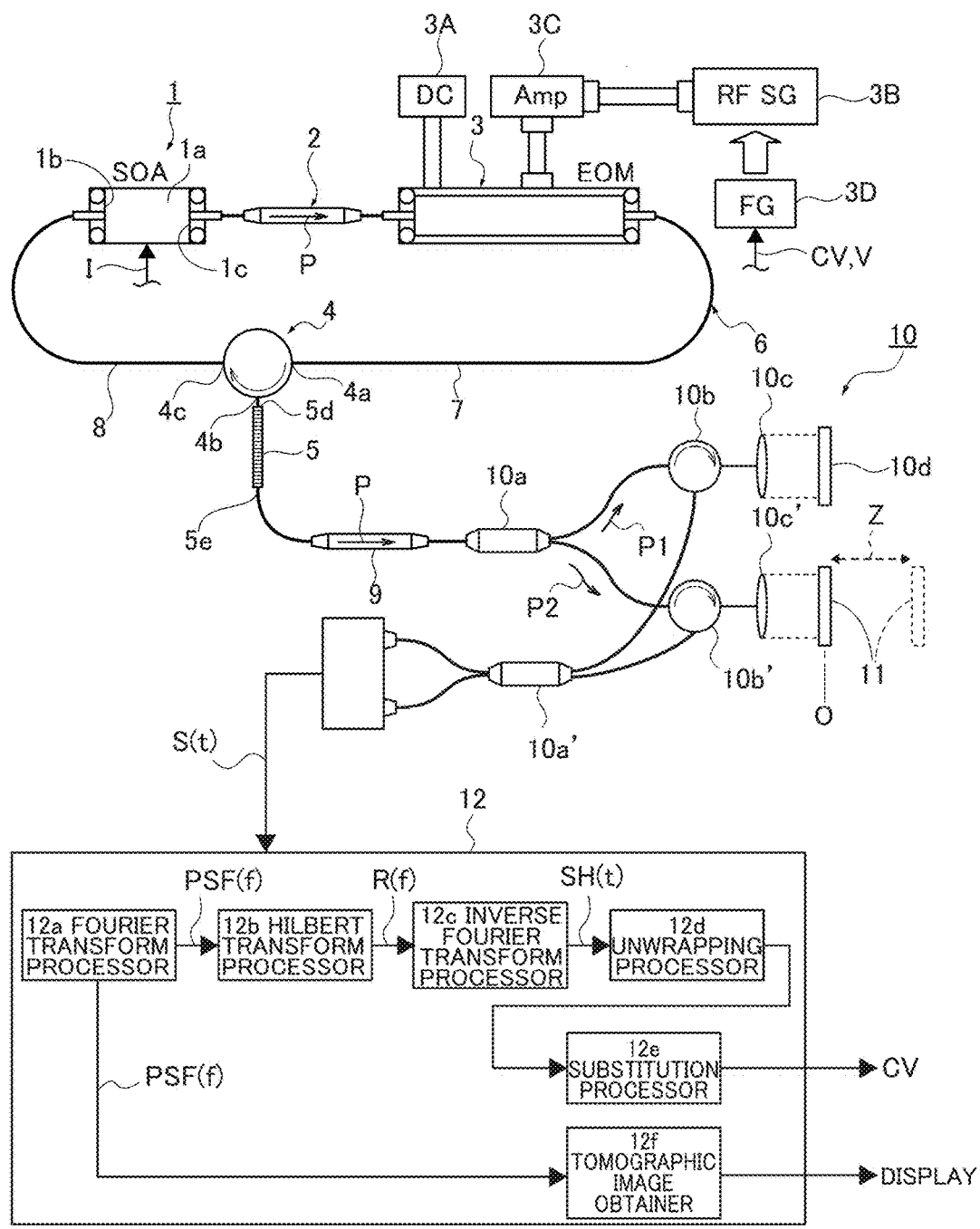
FIG. 3 is a block diagram illustrating a configuration of an interference optical system illustrated in FIG. 1.

A known interference optical system can be used. The interference optical system 10 divides the optical path of the pulse of the laser light P into an optical path for a reference light P1 and an optical path for a measurement light P2 by a coupler 10a as an optical path divider as illustrated in FIG. 3.

The reference light P1 is guided to a collimator lens 10c through a circulator 10b, is guided to a fixed reference mirror 10d disposed in the reference optical path as parallel light flux, and returns to the collimator lens 10c again after being reflected on the fixed reference mirror 10d.

The measurement light P2 is guided to a collimator lens 10c' through a circulator 10b' to be converted into parallel light flux, and then is guided to a measurement target 11 disposed in the measurement optical path.

In this case, a total reflection mirror is disposed as the measurement target 11 for the descriptive purpose. However, a body tissue such as a fundus may be used as the measurement target 11.

The measurement light P2 is reflected on the measurement target 11, and returns to the collimator lens 10c' again.

The reference light P1 is collected by a collimator lens 10c, is guided to a coupler 10a' as an optical path combining part through the circulator 10b, and the measurement light P2 is guided to the coupler 10a' through a collimator lens 10b'.

The after-described spectrum interference signal (interference signal) is generated by the interference of the reference light P1 and the measurement light P2.

Figure 4:
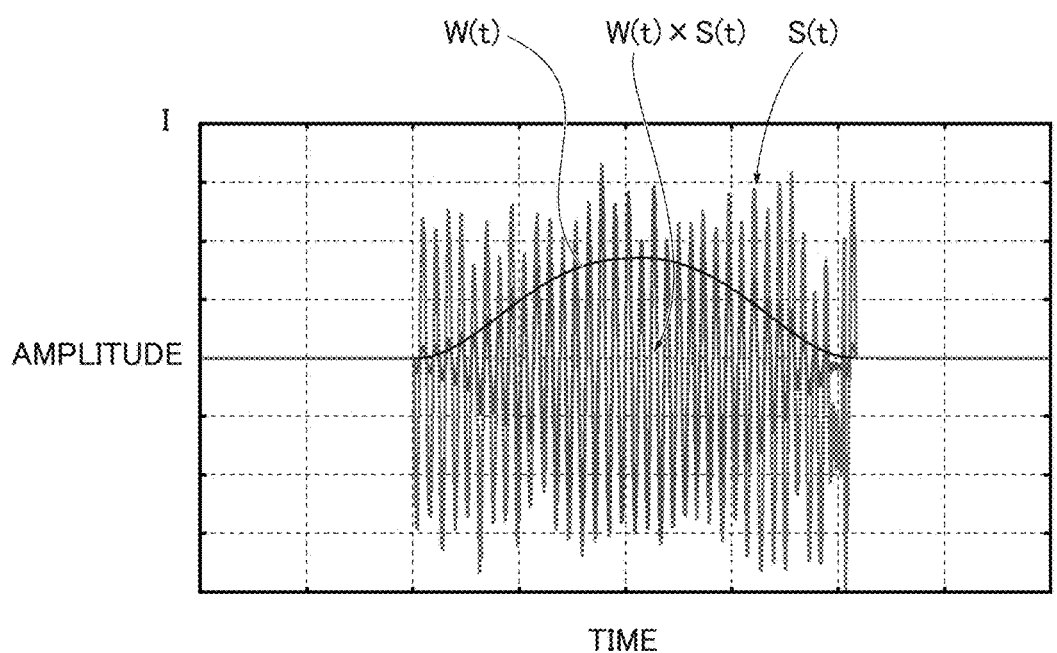
FIG. 4 is a waveform chart illustrating one example of a waveform of a window function and one example of a waveform of a spectrum interference signal output from the interferometer illustrated in FIG. 1.

While the measurement target 11 is placed in the reference position 0 (for example, optical path difference with the fixed reference mirror 10d is 1 mm), when the voltage V of the wavelength-swept light source is temporally varied within one period, and the spectrum interference signal S(t) is sampled at equal time intervals, the spectrum interference signal S(t) shown in FIG. 4 is obtained. This spectrum interference signal S(t) is input to a processor 12.

This processor 12 includes a Fourier transform processor 12a, a Hilbert transform processor 12b, an inverse Fourier transform processor 12c, an unwrapping processor 12d, a substitution processor 12e, and a tomographic image obtainer (tomographic image formation section) 12f.

A known Fourier transform processor 12a can be used. The Fourier transform processor 12a obtains a point-spread-function (spread function) SPF(f) by multiplying the spectrum interference signal S(t) by a first window function W(t) illustrated in FIG. 4. In addition, as $\omega=2\pi f$, when the point-spread-function is obtained by the frequency f, the point-spread-function PSF(f) is obtained by the following equation where C is a coefficient.

$$PSF(f)=C\int S(t)W(t)\exp(i2\pi ft)dt$$

The window function W(t) is used for obtaining a smooth point-spread-function PSF(f).

The following relational expression is established among the frequency f, an optical path difference $c\Delta t$, and the depth z. In addition, c represents a light speed, and $\Delta t$ represents a time difference between the light returned from the fixed reference mirror 10d and the light returned from the measurement target 11.

Figure 5:
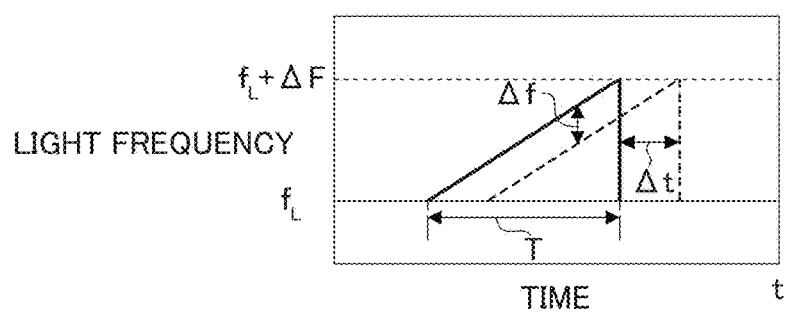
FIG. 5 is a graph showing a relationship between a depth z and a variation in a light frequency.

As illustrated in FIG. 5, t represents a sweep time of one period T. A delay time $\Delta t$ corresponding to the optical path difference is generated between the time required for the reference light P1 returning from the fixed reference mirror 10d and the time required for the measurement light P2 returning from the measurement target 11. The frequency of the measurement light is varied by $f_L+\Delta f$ relative to the frequency $f_L$ of the reference light. In this case, $\Delta f$ is a beat frequency of the spectrum interference signal S(t).

The beat frequency $\Delta f$ corresponds to the variable number f of the point-spread-function PSF(f), and the relational expression of $f=\Delta F \cdot \Delta t/T$ is obtained. In this case, $\Delta F$ represents a sweep frequency width. When the terms of both sides of this expression are multiplied with a light speed c, $cf=c\Delta F \cdot \Delta t/T$ is obtained. Therefore, $cf \cdot T/\Delta F=c\Delta t$ is obtained.

As the depth z is an optical path difference $c\Delta t/2$, the depth z can be obtained by obtaining the sweep frequency width $\Delta F$ and the variable number f.

Figure 6:
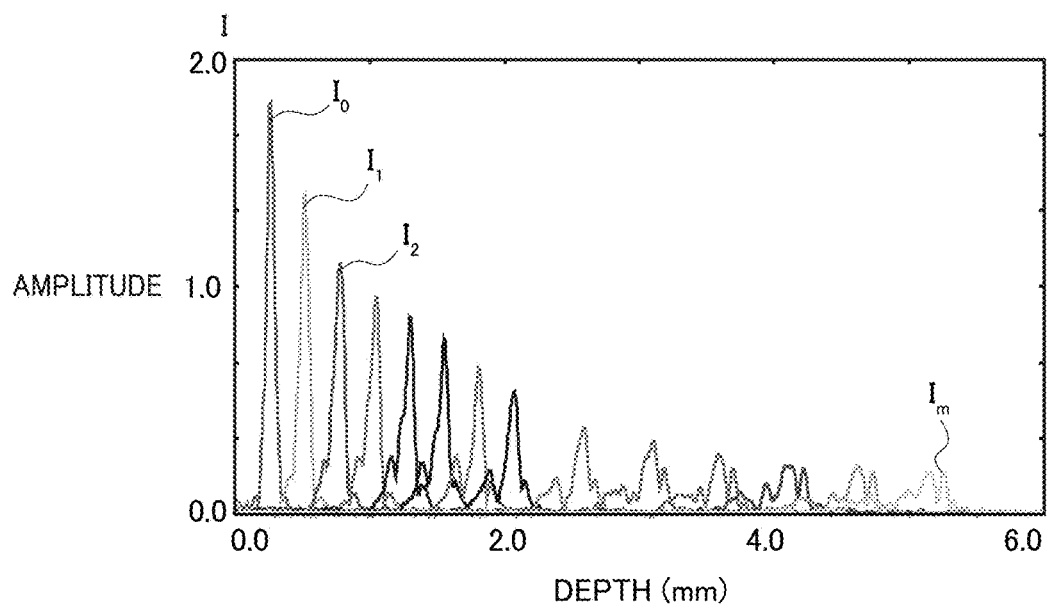
FIG. 6 is a graph describing distortion of a waveform of a point-spread-function before calibration according to the embodiment of the present invention.

When the point-spread frequency PSF(f) is obtained by Fourier transforming the spectrum interference signal S(t) in the Fourier transform processor 12a, the waveform illustrated by reference number $I_0$ in FIG. 6 is obtained.

As illustrated in FIG. 3, when the measurement target 11 is moved from the reference position 0 in the optical axis direction (depth direction Z), the waveforms $I_0, I_1, I_2, \ldots, I_m$ of the obtained point-spread-functions PSF(f) are distorted as shown in FIG. 6 in accordance with an increase in the optical path difference $c\Delta t$ between the measurement target 11 and the fixed reference mirror 10d.

In this embodiment, after a first step of generating the spectrum interference signal S(t) through the sweep of the wavelength of the light of the wavelength-swept light source by varying, relative to a time, the voltage V to be applied to the wavelength-swept light source within one period is executed, a second step of obtaining the point-spread-function PSF(f) by sampling the spectrum interference signal S(t) at the equal time intervals on the time axis, Fourier transforming the sampled spectrum interference signal S(t), and calculating the value obtained by the Fourier transform is executed in the Fourier transform processor 12a.

Figure 7:
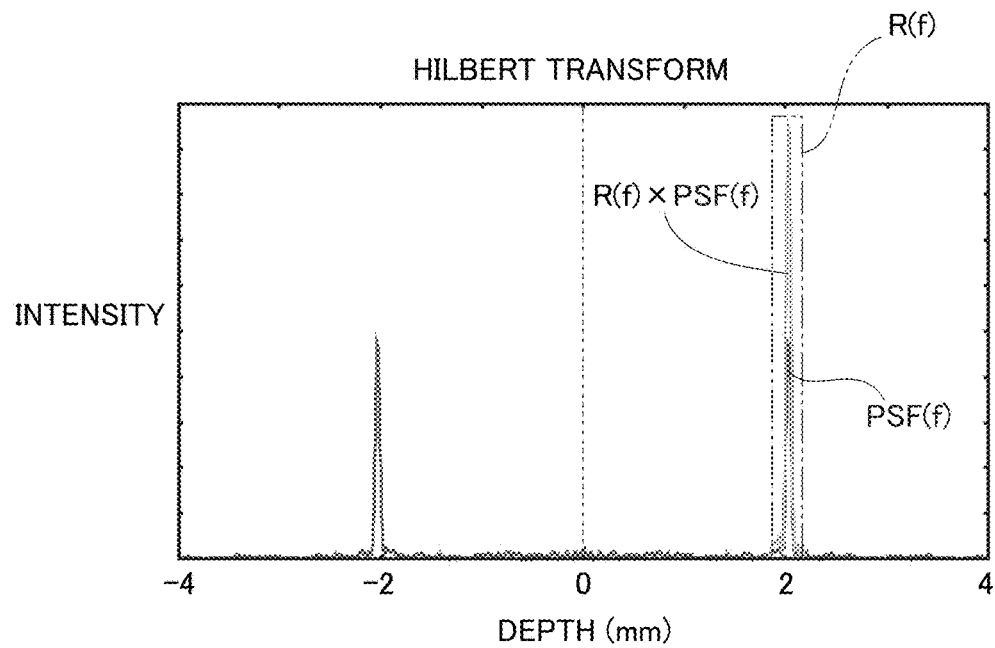
FIG. 7 is a graph showing a waveform of a second window function for executing a Hilbert transform process to the point-spread-function according to the present invention.

Next, in the Hilbert transform processor 12b, a third step of obtaining an analysis signal $S_H(t)$ (SH(t)) including the frequency information of the light of the wavelength-swept light source by determining a second window function R(f) illustrated in FIG. 7 from the point-spread-function PSF(f), and executing the Hilbert transform by inverse Fourier transforming the product of the window function R(f) and the point-spread-function PSF(f) in the inverse Fourier transform processor 12c is executed.

In addition, in the Hilbert transform process, a process of doubling the positive part with the negative part as 0, and the window function R(f) is used such that the circumference of the peak of the point-spread-function PSF(f) for reducing the noise of the complex analysis signal $S_H(t)$ is only used for the calculation.

The complex analysis signal $S_H$ is obtained with the following relational expression with the window function R(f) and the PSF(f).

$$S_H(t) = C \int PSF(f) R(f) \exp(i2\pi f t) df$$

Next, a fourth step of obtaining a variation in the frequency of the light relative to the time within one period T at equal time intervals through a known unwrapping process to the phase information in the unwrapping processor 12d based on the phase information of the complex analysis signal $S_H$ is executed.

Figure 8:
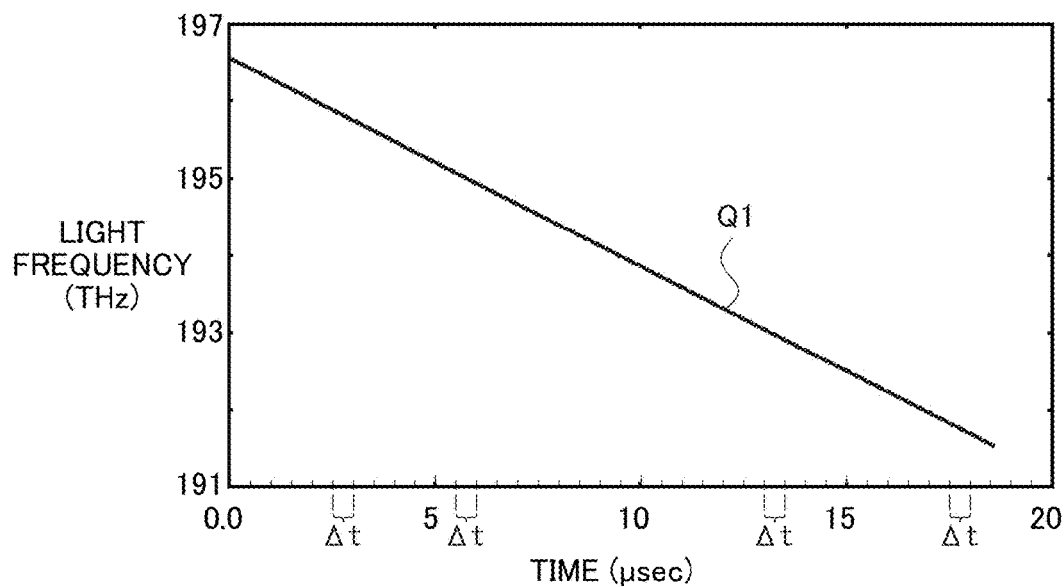
FIG. 8 is a graph showing a curve representing a relationship between a time and a variation in a light frequency obtained by executing an unwrapping process in view of a phase of a complex analysis signal obtained by the Hilbert transform process.

The frequency curve of the frequency f of the light relative to the time t, Q1=t(f) is thereby obtained as shown in FIG. 8.

In FIG. 8, the horizontal axis represents the time t, and the vertical axis represents the variation in the frequency f of the light. The variation in the time t relative to the variation in the frequency f is expressed by the third order polynomial for convenience.

$$t(f) = a_0 + a_1 f + a_2 f^2 + a_3 f^3$$

Figure 9:
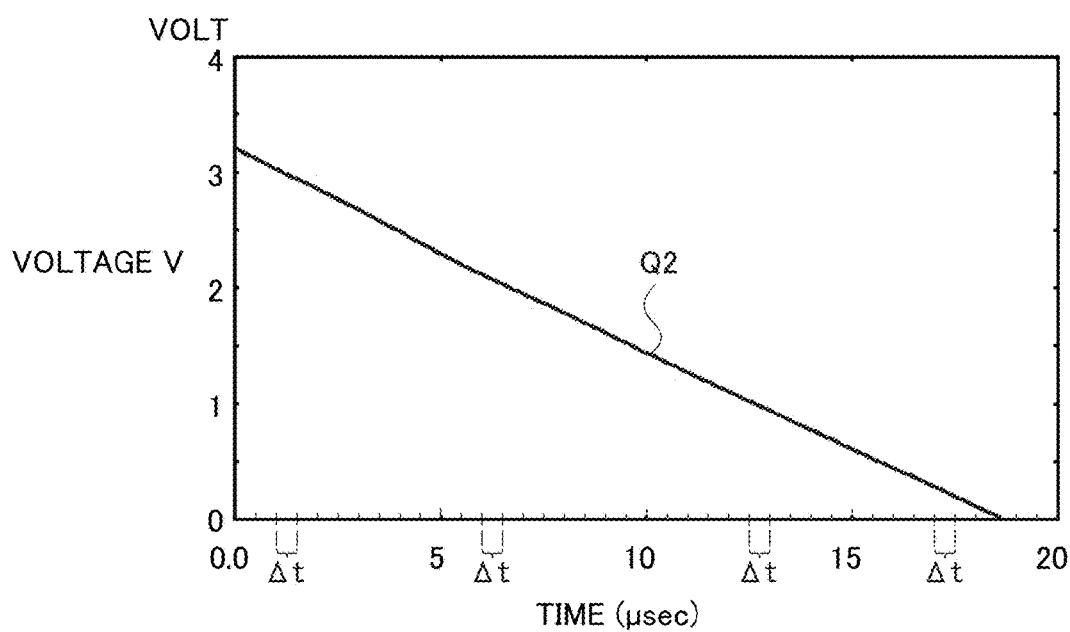
FIG. 9 is a graph showing a curve representing a variation in voltage before the calibration according to the present invention.

The frequency curve Q1 of the light relative to the time axis illustrated in FIG. 8 is a curve that is obtained when a predetermined sweep frequency curve Q2 in which the voltage V illustrated in FIG. 9 varies in a time within one period T as illustrated in FIG. 9.

This voltage V(t) is expressed by the third order polynomial as the function of the sweep frequency f for convenience.

$$V(f) = C_0 + C_1 f + C_2 f^2 + C_3 f^3$$

In addition, reference numerals a and C represent a coefficient.

Figure 10:
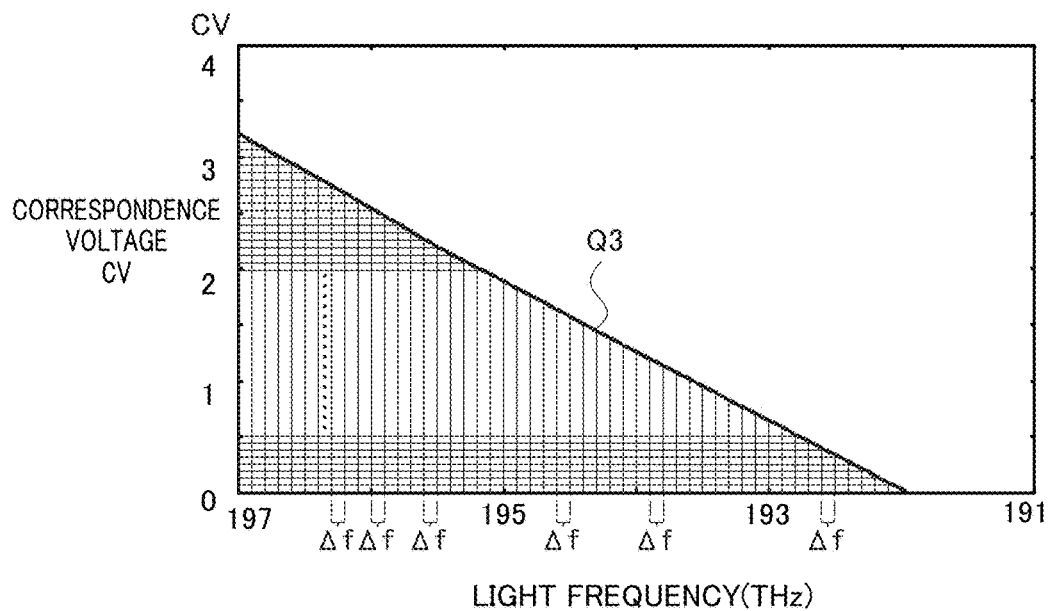
FIG. 10 is a graph showing a curve representing a correspondence relationship between voltage and a light frequency obtained by using the curve in FIG. 8 and the curve in FIG. 9.

Next, in the substitution processor 12e, after a fifth step of obtaining a curve Q3 having a correspondence relationship between the variation in the frequency f of the light within one period T, which is sampled at equal time intervals, and the variation in the voltage V within one period T, which is sampled at equal time intervals, as illustrated in FIG. 10, based on the curves Q1 and Q2 is executed, a sixth step of converting the variation in the frequency f within one period T into correspondence voltage CV when the variation in the frequency f within one period T is subdivided into equal intervals is executed.

Next, the processor 12 executes a seventh step of substituting the voltage V to be applied to the waveform-swept light source applied in the first step into the correspondence voltage CV obtained by the sixth step, and thereby executes the calibration of the control voltage V. Then, the spectrum interference signal S(t) is again obtained by sweeping the waveform-swept light source with the correspondence voltage CV.

Figure 11:
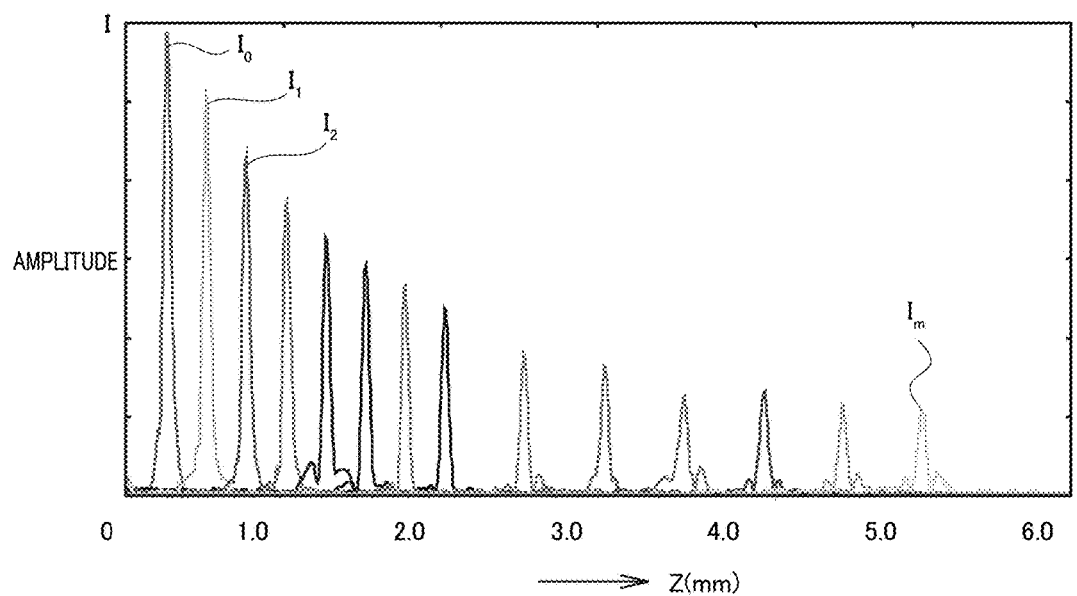
FIG. 11 is a graph showing a waveform of a point-spread-function obtained by sweeping a wavelength with correspondence voltage obtained by using the curve in FIG. 10.

When the point-spread-function PSF(f) is obtained by the Fourier transform processor 2a by Fourier transforming the spectrum interference signal S(t) obtained as described above, the point-spread-functions PSF(f) in which the distortion of the waveforms $I_0, I_1, \ldots, I_m$ corresponding to the depth z is improved are obtained as shown in FIG. 11.

Figure 12:
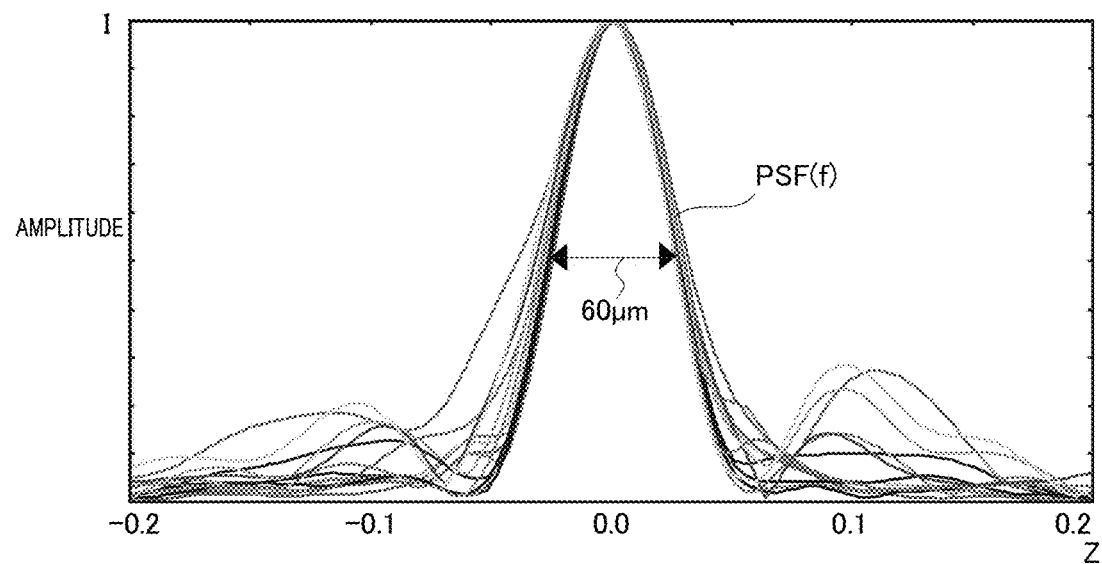
FIG. 12 is a waveform chart in which the normalized dot-spread-functions in FIG. 11 are superimposed.

FIG. 12 is a graph in which the horizontal axis corresponds to the depth z, and the point-spread-functions SPF(f) each having a normalized amplitude intensity I as illustrated in FIG. 11 are superimposed. It can be recognized from FIG. 12, the superimposing level of the intensity of the peak is improved.

Figure 13:
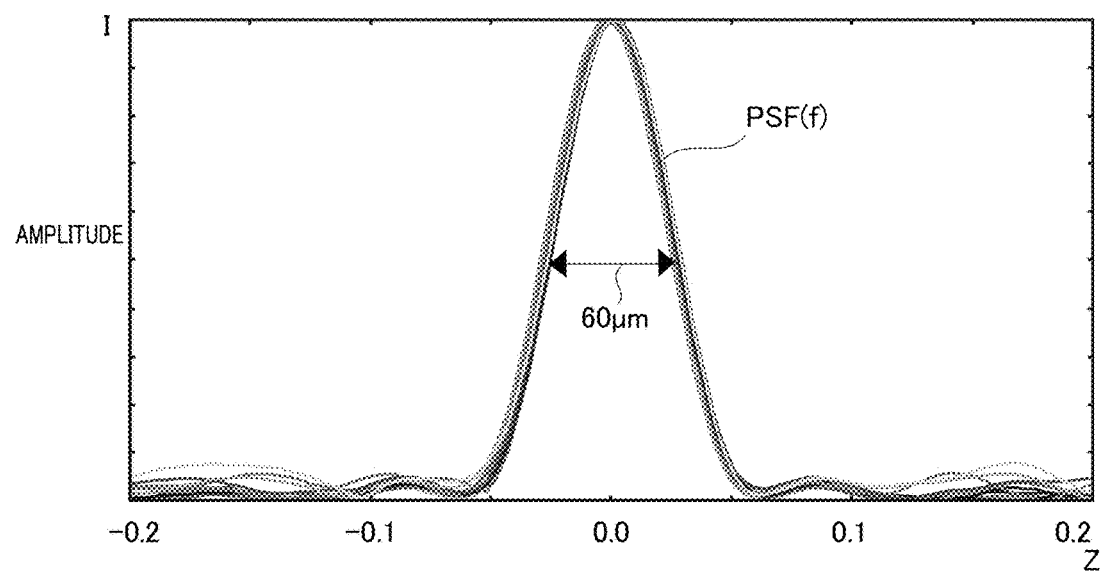
FIG. 13 is a waveform chart in which the normalized dot-spread-functions are superimposed, and the dot-spread functions are obtained by performing a sampling process to the spectrum interference signal obtained by the calibration of the present invention.

In addition, when the resampling technique disclosed in JP2010-3246A is used in conjugation with the technique according to this embodiment, the point-spread-function PSF(f) in which the distortion of the waveform relative to the depth z is improved can be obtained as illustrated in FIG. 13.

When the tomographic image (not shown) is formed by analyzing the point-spread-function PSF(f) in which the waveform distortion is improved by the tomographic image obtainer (tomographic image forming section) 12f, a high quality tomographic image with higher resolution can be obtained.

CROSS-REFERENCE TO RELATED APPLICATION

The present application is based on and claims priority from Japanese Patent Application No. 2014-34812, filed on Feb. 26, 2014, the disclosure of which is hereby incorporated by reference in its entirety.

The invention claimed is:

1. A method comprising:
   calibrating an interferometer by performing:
   a first step of generating a spectrum interference signal through sweep of a wavelength of light of a wavelength-swept light source by varying, relative to a time, voltage to be applied to the wavelength-swept light source within one period;
   a second step of obtaining a point-spread-function by sampling the spectrum interference signal at equal time intervals on a time axis, and Fourier transforming the sampled spectrum interference signal by multiplying by a first window function;
   a third step of obtaining a complex analysis signal including frequency information of the light of the wavelength-swept light source through Hilbert transform with inverse Fourier transform by multiplying the point-spread-function by a second window function;
   a fourth step of obtaining a variation in a frequency of the light relative to a time within one period at equal time intervals by unwrapping phase information of the complex analysis signal;
   a fifth step of obtaining a correspondence relationship between the variation in the frequency of the light within one period, which is sampled at the equal time intervals, and a variation in the voltage within one period, which is sampled at the equal time intervals;
   a sixth step of obtaining correspondence voltage that is obtained when the variation in the frequency of the light within one period is subdivided by using the correspondence relationship between the variation in the voltage and the variation in the frequency of the light obtained in the fifth step; and
   a seventh step of substituting the voltage to be applied to the wavelength-swept light source in the first step into the correspondence voltage obtained by the sixth step.

2. An interferometer, comprising:
   a voltage controller that executes a first step of generating a spectrum interference signal through sweep of a wavelength of light of a wavelength-swept light source by varying, relative to a time, voltage to be applied to the wavelength-swept light source within one period;

a Fourier transform processor that executes a second step of obtaining a point-spread-function by sampling the spectrum interference signal at equal time intervals on a time axis, and Fourier transforming the sampled spectrum interference signal by multiplying by a first window function;

a Hilbert transform processor that executes a third step of obtaining a complex analysis signal including frequency information of the light of the wavelength-swept light source through Hilbert transform with inverse Fourier transform by multiplying the point-spread-function by a second window function;

an unwrapping processor that executes a fourth step of obtaining a variation in a frequency of the light relative to a time within one period at equal time intervals by unwrapping phase information of the complex analysis signal;

a substitution processor that executes a fifth step of obtaining a correspondence relationship between the variation in the frequency of the light within one period, which is sampled at the equal time intervals, and a variation in the voltage within one period, which is sampled at the equal time intervals;

the substitution processor executes a sixth step of obtaining correspondence voltage that is obtained when the variation in the frequency of the light within one period is subdivided by using the correspondence relationship between the variation in the voltage and the variation in the frequency of the light obtained in the fifth step; and the substitution processor executes a seventh step of substituting the voltage to be applied to the wavelength-swept light source in the first step into the correspondence voltage obtained by the sixth step.

3. The interferometer according to claim 2, wherein the wavelength-swept light source includes a semiconductor optical amplifier, an optical isolator, a sweep modulator, a circulator, a dispersion compensator, and the voltage controller that sweeps the wavelength of the light by varying, relative to the time, the voltage to be applied to the sweep modulator within one period.

4. The interferometer according to claim 3, wherein the substitution processor that executes the seventh step substitutes the voltage to the correspondence voltage, and the correspondence voltage is applied to the voltage controller from the substitution processor.

5. The interferometer according to claim 4, wherein the point-spread-function is obtained by Fourier transforming the spectrum interference signal obtained by the correspondence voltage, and a tomographic image is formed by analyzing the point-spread function.

* * * * *